United States Patent [19]

Arnold et al.

[11] Patent Number: 5,071,210
[45] Date of Patent: Dec. 10, 1991

[54] SANDWICH REFLECTION HOLOGRAM

[75] Inventors: Steven M. Arnold, Minnetonka; Anil K. Jain, New Brighton, both of Minn.

[73] Assignee: APA Optics, Inc., Blaine, Minn.

[21] Appl. No.: 458,245

[22] Filed: Dec. 28, 1989

[51] Int. Cl.$^5$ .............................................. G02B 5/32
[52] U.S. Cl. ........................................ 359/19; 359/15; 359/618
[58] Field of Search ................ 350/3.6, 3.7, 3.72, 350/174

[56] References Cited

U.S. PATENT DOCUMENTS

| | | | |
|---|---|---|---|
| 4,261,647 | 4/1981 | Ellis | 350/174 |
| 4,407,564 | 10/1983 | Ellis | 350/3.7 |
| 4,592,620 | 6/1986 | Poole | 350/174 |
| 4,709,666 | 11/1987 | Davis | 350/3.72 |
| 4,713,738 | 12/1987 | Davis | 350/3.6 |
| 4,795,223 | 1/1989 | Moss | 350/3.77 |
| 4,874,214 | 10/1989 | Cheysson et al. | 350/3.7 |
| 4,930,847 | 6/1990 | Cederquist | 350/3.72 |

OTHER PUBLICATIONS

Applications of Holographic Optical Elements Richard Rallison, 12/84.
Holographic Distant Display in Dichromated Gelatin S. Sjolinder & D. Von Gegerfelt, 12/85.

Primary Examiner—Bruce Y. Arnold
Assistant Examiner—J. P. Ryan
Attorney, Agent, or Firm—Merchant, Gould, Smith, Edell, Welter & Schmidt

[57] ABSTRACT

A transmission holographic element (1) composed of a first reflection holographic optical element (2) and a second reflection holographic optical element (3). Reflection holographic optical elements (2,3) are adhesively mated such that the distance separating the two elements is no more than a few wavelengths of the incident light beam (9). The incident light beam (9) passes through first element (2) and is reflected off of the second element (3) which reflects the light beam back towards first element (2) which again reflects the light beam through the second optical element (3). In this manner, two discrete reflection holographic elements (2,3) behave as a single transmission holographic element.

18 Claims, 3 Drawing Sheets

SANDWICH REFLECTION HOLOGRAM

BACKGROUND OF THE INVENTION

1. Field of the Invention

This invention relates generally to holographic optical elements and more particularly to a new method and apparatus in which a transmission holographic optical element is constructed of two reflection holographic optical elements placed together in close proximity.

2. Description of Related Technology

A hologram created by the interference of a plane reference wave and a divergent spherical wave will, when illuminated by a similar planar wave, create a divergent spherical wave (the virtual image) and, when illuminated by an oppositely directed planar wave will create a convergent spherical wave (the real image). Such a hologram behaves as a lens and can therefore be characterized as an optical focusing device. Since such a hologram is used to control the path of a light beam rather than to display an image it is referred to as a holographic optical element. The main advantages of holographic optical elements are that they are lightweight, compact and thin when compared to conventional lenses.

In general, the diffraction efficiency ($\eta$) of an optical element is defined as the percentage of incident light that is diffracted into the image field:

$$\eta\ (\%) = (D/I)\ 100$$

where D is the intensity of diffracted, image forming light, and I is the intensity of incident light.

In a conventional transmission holographic optical element, the diffraction efficiency is a periodic function of index modulation, and can be expressed approximately by the periodic function:

$$\eta = \sin^2(\Delta\phi/2),$$

where $\Delta\phi = 2\pi\ t\Delta n/\lambda \cos\theta$,
t = is the gelatin thickness,
$\Delta n$ = the refractive index modulation,
$\lambda$ = the wavelength, and,
$\theta$ = the angle of incidence.

For a reflection hologram, diffraction efficiency $\eta = \tanh^2(\Delta\phi/2)$, which therefore increases with an increase in either the gelatin thickness or modulation. In principle, the saturation value is 1 (i.e., 100%). In reality, the gelatin absorbs some light and so the saturation value is somewhat less (>95%). In the laboratory, refractive index modulation $\Delta n$ is inferred from measurements of diffraction efficiency. For a transmission hologram, the two vectors representing the incident and diffracted light are nearly parallel and any change in their length (i.e. wavelength) has very little effect on the optimal grating vector, so diffraction efficiency remains high over a broad range of wavelengths. For a reflection hologram, the incident and diffracted light vectors are nearly antiparallel and any change in their length has a very strong effect on the optimal grating vector and thus diffraction efficiency is highly wavelength dependent.

A commercial application of such devices is as the combiner within a "HEADS UP DISPLAY", commonly used on certain types of military aircraft and vision enhancement devices.

A conventional transmission holographic optical element is undesireable for use as a combiner because its "see-through" characteristic is poor.

A "Heads Up Display" using holographic tuned reflective optical coatings is disclosed in U.S. Pat. No. 4,261,647, issued to Ellis. The reflections in the Ellis patent are strictly specular: angle of incidence equals angle of reflection. This necessitates a space of significant wedge between the elements so that the two encounters of the light beam with either element are not parallel; they must differ in angle by at least the angular bandwidth of the reflective coatings. A wedge space of air introduces two additional air-glass interfaces which can scatter light. A wedge space of glass makes for a very heavy assembly. Moreover, any wedged space makes for a complicated optical design as it introduces difficult to compensate off-axis aberrations. Because the two elements of our sandwich are holographic, angle of incidence need not equal angle of diffraction and the geometry therefore will not require a wedged space.

SUMMARY OF THE INVENTION

The present invention functions as a transmission holographic element having a narrower spectral bandwidth, a wider field of view and improved immunity to spurious images in comparison to conventional transmission holographic optical elements.

The present invention is constructed by placing two reflection holographic optical elements in close proximity. The device is designed such that light is able to pass through a first reflection holographic optical element but is then reflected off the surface of the second holographic optical element. This reflected beam encounters the first holographic optical element where it is again reflected, the light beam finally being reflected back towards and through the second holographic optical element Since the distance between the first and second holographic optical element is small, the light beam can be considered to have passed through a single optical element and have been bent through a single angular deflection. In this way, the two discrete reflection holographic optical elements mimic the behavior of a single transmission holographic optical element, but with improved optical characteristics.

An effort is made to maximize diffraction efficiency by attempting to cause $\Delta\phi$ (referring to the diffraction efficiency equation) to become equal to $\pi$ (this is true for the transmission case, but for a Sandwich Reflection Hologram is less critical because of $\eta$ saturation). The quantity $t/\lambda \cos\theta$ is equal to the path length through the gelatin coating, measured in wavelengths. The gelatin thickness, "t" (5 to 20 microns), is readily controllable, whereas control of the gelatin index modulation $\Delta n$ (up to about 0.05) is more difficult to achieve.

DETAILED DESCRIPTION OF THE PREFERRED EMBODIMENT

Figure 1:
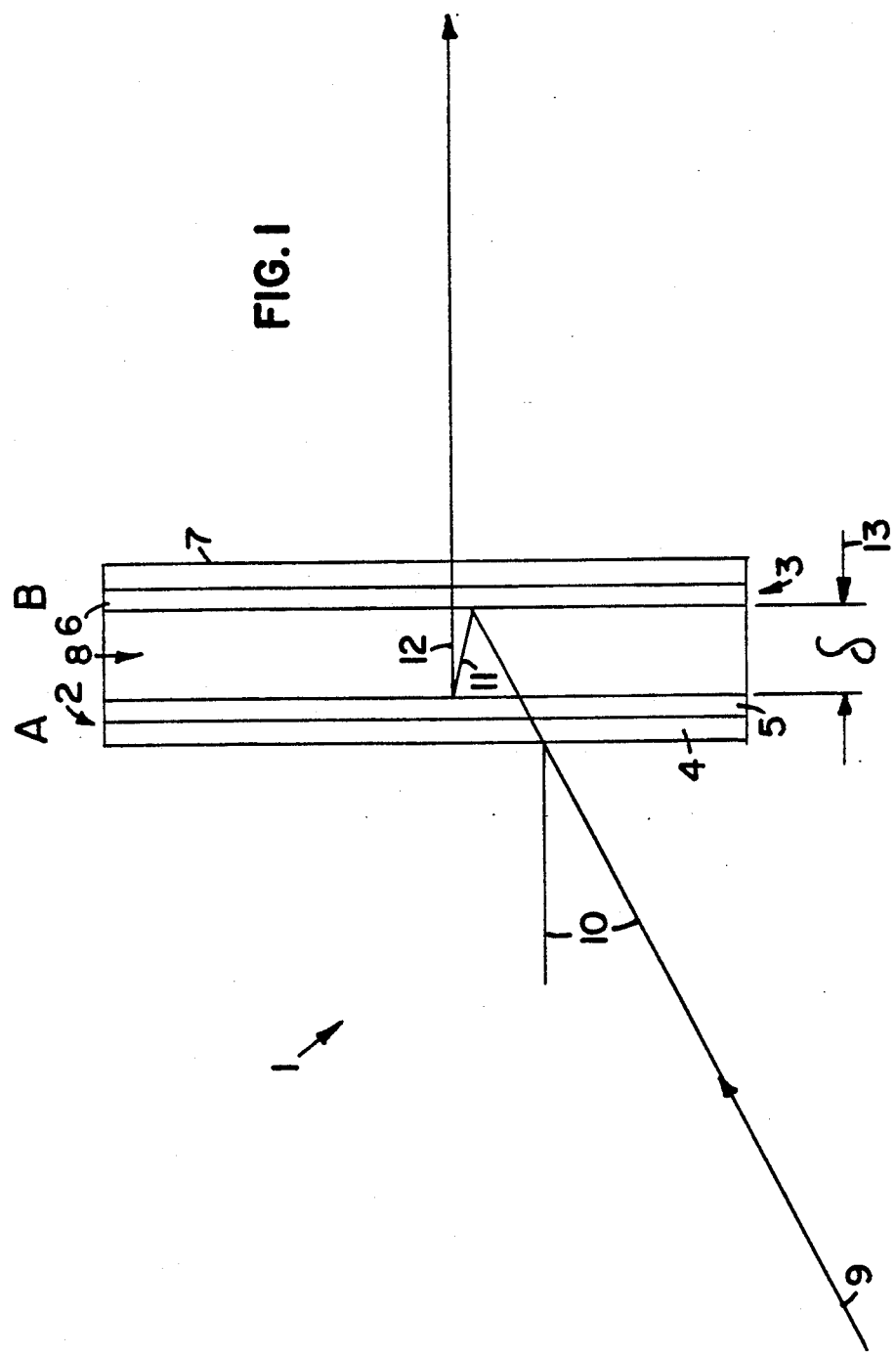
FIG. 1 is a side elevation of a sandwich reflection holographic optical element constructed in accordance with the principles of the present invention.

Referring to FIG. 1, the sandwich reflection holographic optical element is shown generally at 1. A first conventional reflection holographic optical element 2 resides in a parallel relationship with a second reflection holographic optical element 3. The reflection holographic optical elements (2,3) are routinely recorded in a number of materials, most commonly dichromated gelatin. Other materials are available, but all are blue sensitive. DCG is about twice as sensitive at 488 nm as at 514 nm and is very nearly insensitive beyond 600 nm. Ideally, one prefers to create and reconstruct at the same wavelength so that the geometry remains unchanged. Unfortunately, suitable laser sources are not available to exactly match some wavelengths. These hologram recording materials are generally coated to a thickness of several wavelengths (5-15 microns) onto rigid substrates of optical glass or plastic. It is common, particularly in the case of dichromated gelatin, to cement a cover glass or plastic element over the hologram recording material to afford some protection against humidity and physical damage.

The practice of sandwiching holograms between two glass elements can be adapted to the construction of the sandwich reflection hologram, since each of the two reflection holographic optical elements of the sandwich reflection hologram can be fabricated on its own glass substrate. For example, first reflection holographic optical element 2 may be formed on a glass substrate 4 upon which is deposited the gelatin film 5. Similarly, second holographic optical element 3 may be formed by depositing gelatin film 6 onto glass substrate 7. Subsequently, the pair of substrates 4 and 7 is cemented together with gelatin side 5 facing gelatin side 6, the adhesive residing in region 8, the two elements 3 and 2 being separated by a distance 13($\delta$). The plate spacing 13($\delta$) is nominally zero. In practice, since the plates are cemented together the separation 13($\delta$) is equal to the cement thickness.

In practice, contrary to the literal depiction of FIG. 1, the gelatin layers 5 and 6 are usually very much thinner than glass substrates 2 and 7. Typically, the gelatin layers 5 and 6 would have a thickness of ten to twenty microns, whereas the glass substrates 2 and 7 would be several millimeters (several thousand microns) in thickness.

Since each constituent reflection holographic optical element 2, 3 is a thick hologram, it will efficiently diffract only that light which is incident within a limited angular and spectral bandwidth. In the sandwich reflection hologram 1, therefore, a ray of light 9 will encounter each holographical optical element 2, 3 twice in its path through the sandwich reflection hologram 1. First, the light ray 9 passes through reflection holographic optical element 2 without diffraction because its angle of incidence 10 lies sufficiently outside the angular bandwidth of element 2, which in this case requires an angle of incidence nearly parallel to light rays 11 or 12 in order to diffract light beam 9. Next, the light ray 9 is diffracted in a backward direction indicated by the path of light ray 11 by the second reflection holographic optical element 3, which has a different angular bandwidth, in this case, for example, diffracting light with an angle of incidence of between 10° and 25°, that is, having an angle of incidence somewhat similar to that of light rays 9 and 11.

Diffracted light ray 11 again encounters reflection holographic element 2, but is now approaching element 2 an angle of incidence within the angular bandwidth of element 2, that is, for example, less than 10°, and so is diffracted away from element 2. Diffracted light ray 12 encounters second holographic optical element 3 at an angle of incidence of approximately 0°, which falls outside of the angular bandwidth of element 3, thereby, permitting light ray 12 to pass through second holographic optical element 3. The light beam must pass through the first hologram, be reflected by the second hologram, reflected again by the first hologram, and finally transmitted by the second hologram.

Reflections of light waves 9 and 11 begin at the surfaces of the gelatin film layers 6 and 5, respectively, and decrease with increasing depth, insofar as less light is available having been reflected. The physics is similar to that occurring with a multilayered dielectric mirror, except that the layers (grating fringes) are far more numerous and are usually tilted with respect to the substrates 4 and 7. The light beam encounters each hologram twice, at somewhat different angles. The angular bandwidth of each hologram must be such that the diffraction efficiency is high for the desired reflection and low for the desired transmission. In other words the two angles at which the light encounters a hologram must differ by at least one angular bandwidth. Typically, each hologram will have an angular bandwidth of from 5 to 15 degrees (measured in air). Ideally, one must not only control the angular bandwidth, but also make sure that the peak efficiency occurs at the desired angle.

Because the two reflection holographic optical elements 2, 3 comprising the sandwich reflection hologram 1 are in intimate proximity, separated only by distance 13($\delta$) (nominally zero), the net bending of light ray 9 can be considered to occur at a single surface 8. This is an advantage in that the selection of the intermediate wavefront 11 affects only the diffraction efficiency and not the aberration properties of the sandwich reflection hologram 1. Therefore, it is not necessary to precisely control aberrations of the additional intermediate construction wave front used to interferometrically record both reflection holographic elements 2, 3. Only the two construction wave fronts required for a conventional transmission holographic optical element need be precisely controlled.

Figure 2:
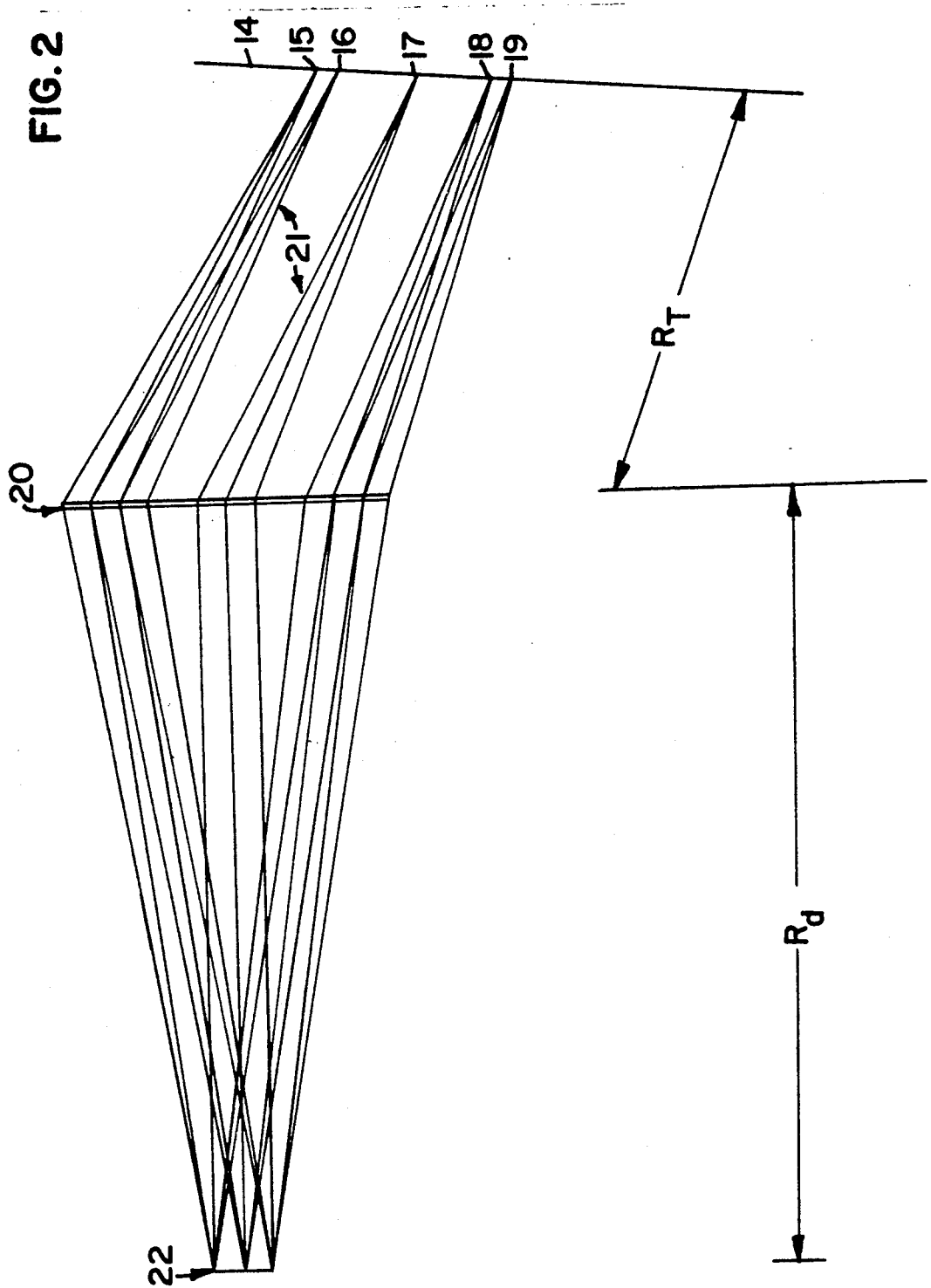
FIG. 2 is a side elevation view showing the geometries for reconstructing a virtual image at infinity as used in a "Heads Up Display"

Referring to FIG. 2, the "readout" or reconstruction geometry of a sandwich reflection holographic optical element, as used, for example, in a "heads up display", is shown. The input transparency plane 14 may be, in a preferred embodiment, a cathode ray tube. Light 21 is emitted from numerous points (15,16,17,18,19) for example on the surface of plane 14, traveling towards sandwich reflection optical element 20. The light 21 is refracted through element 20 and continues traveling until collimated at output plane 22, thereby creating a virtual image at infinity. Output plane 22 could be, for example, the "eye box" of a "heads up display". In this case, optical element 20 serves as the combiner for the "heads up display". In one embodiment the path length Rt is 84 MM and the path length Rd is 120 MM. The thickness of optical element 20 is approximately 5 mm.

Figure 3:
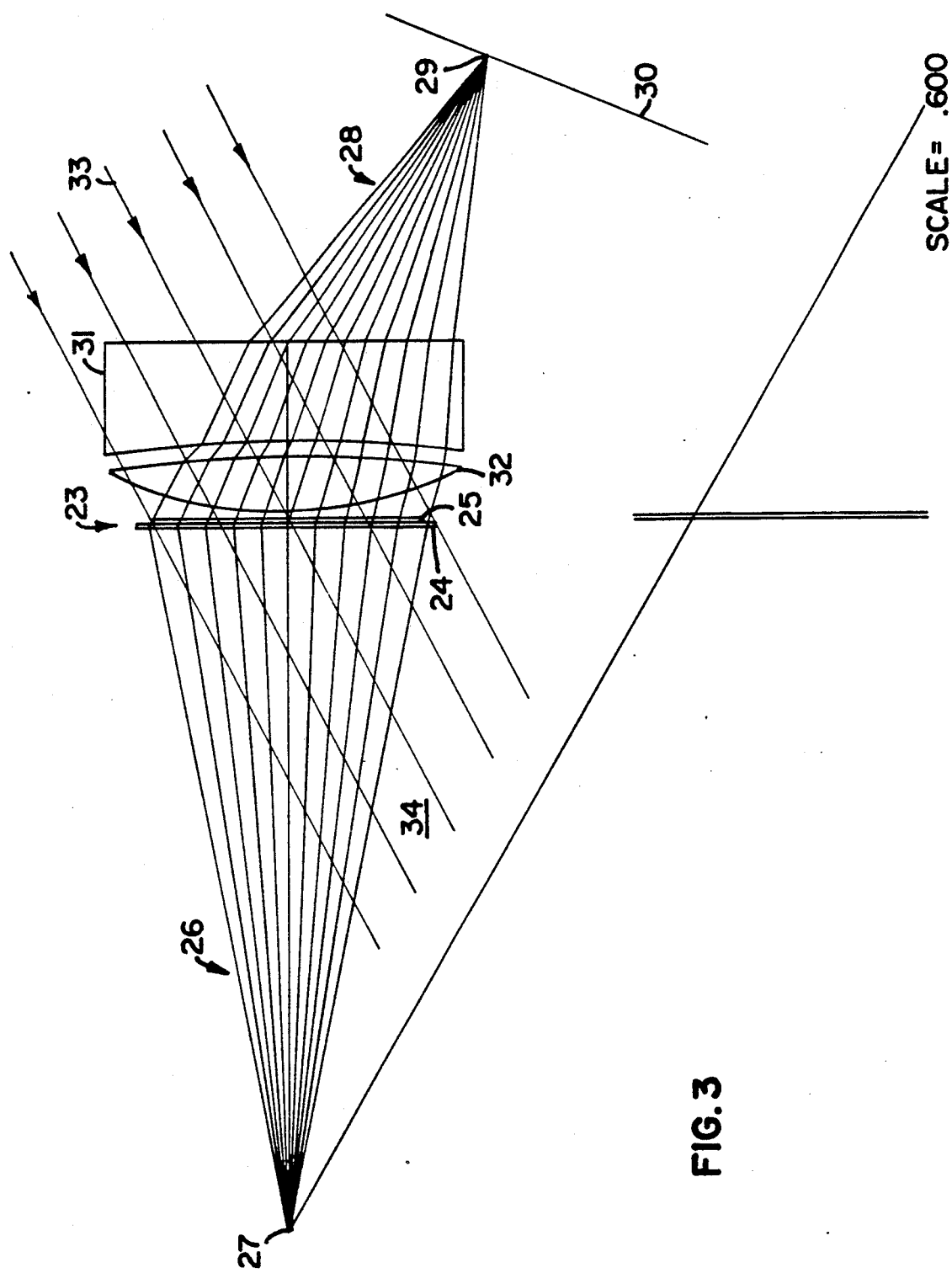
FIG. 3 is a side elevation view showing the geometries for recording the halves of a sandwich reflection holographic optical element.

Referring to FIG. 3, the "recording" or construction geometry of a sandwich reflection holographic optical element is depicted. The holographic optical element 23 is actually composed of a first half 24 and a second half 25, analogous to elements 2 and 3 as depicted in FIG. 1.

The construction of first half 24 is accomplished by light waves 26 emanating from point source 27 interfering with plane wave 33. The construction of second half 25 is accomplished by light waves 28, which are emitted from point source 29 residing on surface 30, interfering with plane wave 34. Light waves 28 pass through divergent lens 31 and objective lens 32 before striking the surface of element half 25, thereby interfering with plane wave 34.

Computer modeling of the sandwich reflection hologram has yielded the following results. Assuming a gelatin thickness of 10 microns and refraction index modulation of 0.03, the intermediate beam between the two reflection components was chosen to be a plane wave. Efficiency versus angle of incidence was computed for two directions in the field of view, namely, center and bottom. The average efficiency of the sandwich reflection hologram was about 65% with an angular bandwidth at the −3 decibel (half power) points being better than nine degrees.

We claim:

1. A transmission holographic element comprising:
   a) a first planar reflection holographic optical element, the first planar reflection holographic optical element having a first angular bandwidth and residing in a first plane;
   b) a second planar reflection holographical optical element, the second planar reflection holographic optical element having a second angular bandwidth, the second reflection holographic optical element residing in a second plane, the second plane residing in a parallel relationship to the first reflection holographic optical element, such that a beam of light passing through the first reflection holographic optical element and being oriented at a first angle to the first plane will be reflected from the second reflection holographic optical element, thereby forming a first reflected beam of light, the first reflected beam of light being reflected from the second reflection holographic optical element toward the first reflection holographic optical element at a second angle, the first reflected beam of light thereafter being reflected from the first reflection holographic element, thereby forming a second reflected beam of light, the second reflected beam of light encountering the second reflection holographic optical element at a third angle, the third angle having an angle of incidence to the second reflection holographic optical element such that the second reflected beam of light passes through the second reflection holographic optical element.

2. The transmission holographic optical element of claim 1, wherein the first reflection holographic optical element and the second reflection holographic optical element are separated by a distance, wherein the distance is nominally zero.

3. The transmission holographic element of claim 2, wherein dichromated gelatin is the recording medium.

4. The transmission holographic element of claim 3, wherein the first reflection holographic optical element comprises a layer of dichromated gelatin deposited upon a first substrate, and the second reflection holographic optical element comprises a second dichromated gelatin layer deposited upon a second substrate, the transmission holographic element being formed by depositing an adhesive layer on the first and second dichromated gelatin layers and bringing the first and second dichromated gelatin layers into physical contact.

5. The transmission holographic element of claim 4 wherein the first and second substrate is composed of glass.

6. The transmission holographic element of claim 5, wherein the adhesive layer has a thickness, the thickness of the adhesive layer and the distance separating the first and second reflection holographic optical elements are substantially equal.

7. The transmission holographic element of claim 6, wherein the distance between the first and second reflection holographic element is between zero wavelengths and one hundred wavelengths.

8. An image display device, comprising:
   a) image generating means, the image generating means emitting light;
   b) a transmission holographic optical element, the transmission holographic optical element comprising:
      (i) a first reflection holographic optical element, the first reflection holographic optical element residing in a first plane;
      (ii) a second reflection holographic optical element, the second reflection holographic optical element residing in a second plane, the first and second reflection holographic optical element residing in parallel planes in close proximity to each other so as to behave as a transmission holographic optical element;
   c) combiner means, the combiner means being positioned so as to intercept emitted light from the image generating means, the combiner means collimating the emitted light so as to reform the image on a plane remote from the combiner means, the combiner means being a transmission holographic optical element.

9. The image display device of claim 8, wherein the first reflection holographic optical element and the second holographic optical element are adhesively mated.

10. The image display device of claim 9, wherein the adhesive mating of the first and second holographic optical element creates a region of separation between the first and second holographic optical elements, the region having a thickness, the thickness being proportionate to an amount of adhesive residing within the region of separation.

11. The image display device of claim 9, wherein the thickness of the region of separation is nominally zero.

12. The image display device of claim 9, wherein the thickness of the region of separation is less than one hundred wavelengths of the emitted light.

13. A method of forming a transmission holographic optical element, comprising the steps of:
   a) creating a first reflection holographic optical element;
   b) creating a second reflection holographic optical element; and
   c) placing the first and second holographic optical elements in a proximate relationship, such that the first and second holographic optical elements behave as a transmission holographic optical element.

14. The method of claim 13, further comprising the steps of:
   a) forming the first reflection holographic optical element on a first surface;

b) forming the second reflection holographic optical element on a second surface; and c) causing the first and second reflection holographic optical elements to reside in a substantially mating relationship.

15. The method of claim 14, further comprising the step of applying a layer of an adhesive substance to the first reflection holographic element, thereby causing the first holographic optical element to adhere to the second holographic optical element.

16. The method of claim 15, further comprising the steps of:

a) creating a first reflection holographic optical element by applying a first layer of dichromated gelatin to a first substrate material;

b) creating a second reflection holographic optical element by applying a second layer of dichromated gelating to a second substrate material;

c) applying a layer of an adhesive substance to the first layer of dichromated gelatin; and d) causing the second layer of dichromated gelatin to contact the adhesive substance layer.

17. The method of claim 14, further comprising the step of rigidly affixing the first reflection holographic optical element to the second reflection holographic optical element.

18. The method of claim 13, further comprising the step of creating a second reflection holographic optical element by forming a layer of dichromated gelatin in an abutting relationship with the first reflection holographic optical element.

* * * * *

UNITED STATES PATENT AND TRADEMARK OFFICE
CERTIFICATE OF CORRECTION

PATENT NO. : 5,071,210

DATED : December 10, 1991

INVENTOR(S) : STEVEN M. ARNOLD et al.

It is certified that error appears in the above-identified patent and that said Letters Patent is hereby corrected as shown below:

Column 4, line 3, insert --at-- after "2".
Column 5, line 27, for "holographical" read --holographic--.
Column 8, line 3, for "gelating" read --gelatin--.

Signed and Sealed this

Eighth Day of June, 1993

Attest:

MICHAEL K. KIRK

Attesting Officer

Acting Commissioner of Patents and Trademarks